United States Patent
She et al.

(10) Patent No.: US 11,649,351 B2
(45) Date of Patent: May 16, 2023

(54) RESIN COMPOSITION FOR A METAL SUBSTRATE, AND RESIN VARNISH AND METAL BASE COPPER-CLAD LAMINATE COMPRISING THE SAME

(71) Applicant: SHENGYI TECHNOLOGY CO., LTD., Guangdong (CN)

(72) Inventors: Naidong She, Guangdong (CN); Zengbiao Huang, Guangdong (CN)

(73) Assignee: Shengyi Technology Co., Ltd., Guangdong (CN)

( * ) Notice: Subject to any disclaimer, the term of this patent is extended or adjusted under 35 U.S.C. 154(b) by 0 days.

(21) Appl. No.: 16/849,041

(22) Filed: Apr. 15, 2020

(65) Prior Publication Data

US 2020/0332109 A1 Oct. 22, 2020

(30) Foreign Application Priority Data

Apr. 22, 2019 (CN) .......................... 201910323656.X (51) Int. Cl.
| | |
|---|---|
| *C08L 63/00* | (2006.01) |
| *C09D 163/00* | (2006.01) |
| *C09D 7/61* | (2018.01) |
| *B32B 15/20* | (2006.01) |
| *B32B 15/04* | (2006.01) |
| *B32B 7/12* | (2006.01) |
| *B32B 15/18* | (2006.01) |
| *C09J 163/00* | (2006.01) |
| *B32B 15/092* | (2006.01) |

(52) U.S. Cl.
CPC ................ *C08L 63/00* (2013.01); *B32B 7/12* (2013.01); *B32B 15/043* (2013.01); *B32B 15/092* (2013.01); *B32B 15/18* (2013.01); *B32B 15/20* (2013.01); *C09D 7/61* (2018.01); *C09D 163/00* (2013.01); *C09J 163/00* (2013.01)

(58) Field of Classification Search
CPC .. C08L 63/00; C08L 2203/20; C08L 2201/08; C09J 163/00; B32B 15/092; B32B 7/12; B32B 15/043; B32B 15/18; B32B 15/20; B32B 27/20; B32B 27/38; B32B 15/01; B32B 37/12; B32B 37/10; B32B 2255/06; B32B 2255/26; B32B 2307/306; B32B 2457/00; C09D 7/61; C09D 163/00; C08G 2650/56; C08G 59/502; C08G 59/5033; C08G 59/686; C08K 2003/385; C08K 2003/2227

See application file for complete search history.

(56) References Cited

U.S. PATENT DOCUMENTS

| | | | | |
|---|---|---|---|---|
| 5,362,926 A | * | 11/1994 | Fukuda | ................ H01L 23/053 174/256 |
| 2013/0277867 A1 | * | 10/2013 | Yuzuriha | ................ C08K 3/36 257/791 |
| 2014/0367883 A1 | | 12/2014 | Hatakeyama et al. | |
| 2015/0369467 A1 | * | 12/2015 | Saito | .................... H05K 3/0011 362/345 |
| 2018/0257350 A1 | * | 9/2018 | Lenzi | ......................... C08J 5/10 |
| 2018/0258279 A1 | * | 9/2018 | Tsutsumi | ................ C08L 25/14 |

FOREIGN PATENT DOCUMENTS

| | | |
|---|---|---|
| CN | 101974208 A | 2/2011 |
| CN | 102304273 A | 1/2012 |
| CN | 102365330 A | 2/2012 |
| CN | 103351581 A | 10/2013 |
| CN | 103468188 A | 12/2013 |
| CN | 104610707 A | 5/2015 |
| CN | 104708869 A | 6/2015 |
| CN | 105473634 A | 4/2016 |
| CN | 103923590 B | 6/2016 |
| CN | 106633646 A | 5/2017 |
| CN | 107849351 A | 3/2018 |
| CN | 108995346 A | 12/2018 |
| CN | 109627687 A | 4/2019 |
| JP | 2013-194094 A | 9/2013 |
| JP | 2013216830 A | 10/2013 |
| JP | 2016155946 A | 9/2016 |
| TW | I468482 B | 1/2015 |
| TW | 201504325 A | 2/2015 |

OTHER PUBLICATIONS

Mitsubishi, "jER Epoxy Resin Catalogue", 2016, p. 10, https://docplayer.net/46149237-Jer-epoxy-resin-catalogue.html (Year: 2016).*
Office Action issued in corresponding Chinese Patent Application No. 201910323656.X dated Mar. 3, 2021.

* cited by examiner

*Primary Examiner* — Callie E Shosho
*Assistant Examiner* — Bethany M Miller
(74) *Attorney, Agent, or Firm* — Norton Rose Fulbright US LLP; James R. Crawford (57) ABSTRACT

The present disclosure provides a resin composition for a metal substrate, and a resin varnish and a metal base copper-clad laminate comprising the same. The resin composition comprises 5-40% of a main resin and 60-95% of a thermally conductive filler when the total weight of the resin composition is calculated as 100%, wherein the main resin comprises 60-90% of a flexible epoxy resin having a structure as shown in Formula I and 10-40% of a phenoxy resin when the total weight of the main resin is calculated as 100%. The resin composition provided by the present disclosure has a low modulus, can alleviate the stress generated by thermal shocks and can withstand more than 1000 thermal cycles.

9 Claims, 2 Drawing Sheets

RESIN COMPOSITION FOR A METAL SUBSTRATE, AND RESIN VARNISH AND METAL BASE COPPER-CLAD LAMINATE COMPRISING THE SAME

CROSS-REFERENCE FOR RELATED APPLICATIONS

The present disclosure claims the benefit of Chinese Application No. 201910323656.X filed on Apr. 22, 2019 to the China National Intellectual Property Administration, the entire content of which is incorporated herein by reference.

TECHNICAL FIELD

The present disclosure belongs to the field of laminates, and relates to a resin composition for a metal substrate, and a resin varnish and a metal base copper-clad laminate comprising the same.

BACKGROUND

Along with the mass production and light, thin, small and multi-function designs of electronic information products, printed circuit boards which are served as the main support of electronic components are also being continuously improved to provide high-density wiring, thin, fine pores, and high heat dissipation. In this context, metal base copper-clad laminates with high heat dissipation were developed. In a case where a metal base copper-clad laminate is applied to a high-power LED lamp, the thermal expansion coefficient of the high-power chip is much less than that of the metal substrate which results in great difference between stress released by the chip and the substrate after thermal shocks such that cracks are occurred in weakest solder joints or copper foil circuits, thereby affecting reliability. The metal base copper-clad laminate is generally made by bonding a metal substrate, a thermally conductive insulating bonding layer and a copper foil. The presence of a thermally conductive insulating bonding layer may alleviate the stress generated by thermal shocks to some extent, but still cannot satisfy the reliability requirements. CN104708869A discloses a high thermal-conductive aluminum-based copper-clad laminate and a method for preparing the same, comprising a copper foil layer, a high thermal conductive insulating layer and an aluminum plate arranged in sequence from the inside to the outside, wherein the high thermal conductive insulating layer is filled with alumina fibers made by micro-arc oxidation. The patent discloses improving the heat dissipation capability of the aluminum-based copper-clad board and increasing the reliability of the aluminum-based copper-clad board, but it does not involve how to solve the problem of weld point or copper foil destruction from the stress generated by the thermal shock. CN103468188A discloses a magnetic composite glue comprising 1 to 200 parts by weight of permeability magnetic conductive powder, 10 parts by weight of a resin, 1 part by weight of calcium carbonate, 0.1 to 1 part by weight of an active dispersant and other additives, and 0.1-1 part by weight of a latent curing accelerator, or comprising 1000-2000 parts by weight of permeability magnetic conductive powder, 10 parts by weight of rubber, 1 part by weight of calcium carbonate, 1-5 parts by weight of an active dispersant and other additives, and 1-5 parts by weight of a latent curing accelerator. After curing, the glue of this patent generates very little stress on the object in contact with it when subjected to thermal shock cycles from −40° C. and 125° C. such that sheet material with a strength of 1.5 N will not crack. The curing strength is such that it can withstand a destructive force of 50 N or more after subjected to 200 thermal shock cycles from −40° C. to 85° C. However, it remains to be studied whether it can be applied to the field of laminates.

In order to improve the toughness and flexibility of the film material, a small amount of thermoplastic resin, rubber-toughening epoxy resin or other epoxy resin for modifying toughness may be added to the main resin. Due to low thermal conductivity and poor resistance against thermal shocks, the resin composition cannot be used as a thermal conductive insulating bonding layer in metal base copper-clad laminates.

Therefore, there is a need to develop a thermally conductive resin composition which has excellent resistance against thermal shocks for using in a metal substrate.

SUMMARY

An object of the present disclosure is to provide a resin composition for use in a metal substrate, and a resin varnish and a metal base copper-clad laminate comprising the same. The resin composition provided by the present disclosure can withstand changes in thermal shocks, and has a low modulus such that cracking of solder joints or copper foil circuits caused by the mismatch between the thermal expansion coefficients of the chip and the substrate can be avoided.

To achieve the object, the present disclosure discloses the following technical solutions.

In a first aspect, the present disclosure provides a resin composition for use in a metal substrate, comprising 5-40% of a main resin and 60-95% of a thermally conductive filler when the total weight of the resin composition is calculated as 100%.

Wherein, the main resin comprises 60-90% of a flexible epoxy resin and 10-40% of a phenoxy resin when the total weight of the main resin is calculated as 100%.

Wherein, the flexible epoxy resin has a structure as shown in Formula I:

Formula I

Wherein R is selected from C2-C20 linear or branched alkylene groups, —CO—$R_1$—CO— or —$R_2$—O—$R_3$—O—$R_4$—.

Wherein $R_1$ is selected from C2-C20 linear or branched alkylene groups; $R_2$ and $R_4$ are each independently selected from C1-C10 linear or branched alkylene groups; $R_3$ is selected from C2-C15 linear or branched alkylene groups, C6-C17 cycloalkyl group and wherein $R_5$ is selected from C1-C10 linear or branched alkylene groups; and m is an integer from 1-10, e.g. 2, 3, 4, 5, 6, 7, 8, 9 and the like.

$n_1$ represents a repeating unit of 4-10, e.g. 5, 6, 7, 8, 9 and the like.

The C2-C20 may be C3, C4, C5, C6, C7, C8, C9, C10, C11, C12, C13, C14, C15, C16, C17, C18, C19 and the like.

The C1-C10 may be C2, C3, C4, C5, C6, C7, C8, C and the like.

The C2-C15 may be C3, C4, C5, C6, C7, C8, C9, C10, C11, C12, C13, C14 and the like.

The C6-C17 may be C7, C8, C9, C10, C11, C12, C13, C14, C15, C16 and the like.

In the present disclosure, a flexible epoxy resin having the specific structure is included in the main resin. The flexible epoxy resin provided by the present disclosure can ensure the finally obtained resin composition to have a low modulus. The low modulus can well alleviate the stress generated by thermal shocks, thereby avoiding cracks in solder joints or copper foil circuits caused by the mismatch between the thermal expansion coefficients of the chip and the substrate.

Meanwhile, the main resin comprises a phenoxy resin. The use of the phenoxy resin can avoid the stickiness of the finally obtained film or RCC (coated resin copper foil) caused by a too high addition amount of the flexible epoxy resin. Moreover, different from other epoxy resins, the addition of a phenoxy resin to the flexible epoxy resin can avoid greatly increasing the modulus of the composition, while the low modulus of the composition is the guarantee of alleviating stress generated by thermal shocks.

In a case where a metal base copper-clad laminate in the prior art is used (for example, an LED lighting lamp), the chip, solder joint, copper foil circuit, thermally conductive insulating bonding layer, and metal substrate are all at normal positions at a normal temperature. Once subjected to thermal expansion, the metal substrate, thermally conductive insulating bonding layer and copper foil circuit will be deformed, thereby readily rendering cracks in the solder joint or copper foil circuit after thermal expansion and cooling. However, in a case where the resin composition for use in a metal substrate of the present disclosure is used as a thermally conductive insulating bonding layer, due to the low modulus thereof, only the metal substrate and the thermally conductive insulating bonding layer are deformed, but the copper foil layer is substantially not deformed when subjected to thermal expansion. Therefore, no cracking occurs in the solder joint or copper foil circuit after thermal expansion and cooling.

The main resin is in an amount of 5-40%, e.g. 8%, 10%, 12%, 15%, 18%, 20%, 22%, 25%, 28%, 30%, 32%, 35%, 38% and the like.

In the present disclosure, $R_3$ is selected from C2-C15 linear or branched alkylene groups, C6-C17 aliphatic cycloalkyl, ethyleneoxyethylene, bis(ethyleneoxy)ethylene, tris(ethyleneoxy)ethylene, propyleneoxypropylene, bis(propyleneoxy)propylene, tris(propyleneoxy)propylene, tetrakis(propyleneoxy)propylene, butyleneoxybutylene, bis(butyleneoxy)butylene, tris(butyleneoxy)butylene or tetrakis(butyleneoxy)butylene.

Preferably, the main resin further comprises a biphenyl epoxy resin.

Preferably, when the total weight of the main resin is calculated as 100%, the biphenyl epoxy resin is added in an amount of 1-20%, e.g. 2%, 5%, 8%, 10%, 12%, 15% or 18%.

A biphenyl epoxy resin is added into the main resin. The use of the biphenyl epoxy resin can increase the thermal resistance of the resin composition.

Preferably, the resin composition further comprises a curing agent.

Preferably, when the total weight of the main resin is calculated as 100%, the curing agent is added in an amount of 1-10%, e.g. 2%, 3%, 4%, 5%, 6%, 7%, 8% or 9%.

Preferably, the curing agent is an amine curing agent.

Preferably, the curing agent is any one or a combination of at least two selected from the group consisting of ethylenediamine, diethylenetriamine, triethylenetetramine, tetraethylenepentamine, isophoronediamine, m-phenylenediamine, m-aminomethylamine, diaminodiphenyl sulfone, dicyandiamide, diaminodicyclohexyl methane, methylcyclopentanediamine, diamine methylcyclohexanediamine or diaminodiphenylmethane.

The flexible epoxy resin is in an amount of 60-90%, e.g. 62%, 65%, 68%, 70%, 72%, 75%, 78%, 80%, 82%, 85%, 88% and the like.

Preferably, the flexible epoxy resin has a weight per epoxy equivalent of 300-500 g/eq, e.g 320 g/eq, 340 g/eq, 360 g/eq, 380 g/eq, 400 g/eq, 410 g/eq, 420 g/eq, 430 g/eq, 44 g/eq, 450 g/eq, 560 g/eq, 470 g/eq, 480 g/eq, 490 g/eq and the like.

The phenoxy resin is in an amount of 10-40%, e.g. 12%, 15%, 18%, 20%, 22%, 25%, 28%, 30%, 32%, 35%, 38% by weight and the like.

If the content of the phenoxy resin is too low, it will not be able to prevent the film or RCC (coated resin copper foil) from being sticky. If the content of the phenoxy resin is too high, a dense protective film will be formed on the surface of the resin composition during drying process, which will hinder the evaporation of the solvent, thereby causing bubbles on the surface of the film or RCC (coated resin copper foil) so as to affect the electrical insulation of the laminate.

Preferably, the phenoxy resin has a weight average molecular weight of 30,000-65,000, e.g. 35000, 40000, 45000, 50000, 55000, 60000 and the like.

When the phenoxy resin has a too small weight average molecular weight, cracks may occur in the thermally conductive insulating bonding layer after lamination, which may affect the use of the metal base copper-clad laminate. When the weight average molecular weight is too high, it will not be able to prevent the film or RCC (coated resin copper foil) from being sticky.

The thermally conductive filler is in an amount of 60-95%, e.g. 62%, 65%, 68%, 70%, 72%, 75%, 78%, 80%, 82%, 85%, 88%, 90%, 92% and the like.

The content of the thermally conductive filler affects the thermal conductivity and modulus of the resin composition. Reducing the content of the thermal conductive filler will reduce the thermal conductivity and modulus at the same time; and increasing the content of the thermal conductive filler will increase the thermal conductivity and modulus at the same time. In order to ensure a suitable thermal conductivity and a low modulus of the resin composition, the content of the thermally conductive filler is controlled to be 60-95%.

Preferably, the thermally conductive filler comprises any one or a combination of at least two selected from the group consisting of aluminum nitride, boron nitride, aluminum oxide, silicon carbide, zinc oxide and carbon nanotubes, further preferably any one or a combination of at least two selected from the group consisting of boron nitride, aluminum oxide and silicon carbide.

Preferably, the resin composition further comprises a curing accelerator.

Preferably, when the total weight of the main resin is calculated as 100%, the curing accelerator is added in an amount of 0.1-2%, e.g. 0.2%, 0.5%, 0.8%, 1.0%, 1.2%, 1.5% or 1.7%.

In the formulation of the present disclosure, in addition to the above components, some auxiliary agents such as antifoaming agents, dispersing agents, anti-aging agents and the like may be added without departing from the scope of the present disclosure.

In a second aspect, the present disclosure provides a resin varnish obtained by dissolving or dispersing the resin composition for use in a metal substrate as described in the first aspect into a solvent.

The solvent used in the present disclosure is any one or a combination of at least two selected from the group consisting of dimethylformamide, butanone, acetone, cyclohexanone and toluene solvent.

In a third aspect, the present disclosure provides a film comprising the resin composition for use in a metal substrate as described in the first aspect.

In a fourth aspect, the present disclosure provides a metal base copper-clad laminate comprising a metal substrate, a thermally conductive insulating bonding layer prepared from the resin composition for use in a metal substrate as described in the first aspect and a copper foil which are laminated together from bottom to top.

The resin composition for use in a metal substrate provided by the present disclosure which is used as a thermal conductive insulating bonding layer between the metal substrate and the copper foil can well alleviate the stress of the metal substrate generated by thermal shocks, thereby avoiding cracks in solder joints or copper foil circuits caused by the mismatch between the thermal expansion coefficients of the chip and the substrate.

Preferably, the metal substrate comprises any one selected from the group consisting of an aluminum substrate, a copper substrate, an iron substrate and a steel substrate.

Preferably, the metal substrate has a thickness of 0.3-5.0 mm, e.g. 0.5 mm, 1.0 mm, 1.5 mm, 2 mm, 2.5 mm, 3 mm, 3.5 mm, 4.0 mm, 4.5 mm and the like.

Preferably, the thermally conductive insulating bonding layer has a thickness of 0.04-0.20 mm, e.g. 0.05 mm, 0.08 mm, 0.10 mm, 0.12 mm, 0.15 mm, 0.18 mm and the like.

If the thermally conductive insulating bonding layer has a too small thickness, the stress generated by thermal shocks may not be well alleviated.

Preferably, the copper foil is an electrodeposited copper foil or a rolled copper foil.

Preferably, the copper foil has a thickness of 0.012-0.210 mm, e.g. 0.018 mm, 0.035 mm, 0.070 mm, 0.105 mm, 0.140 mm, 0.175 mm.

In the present disclosure, the metal base copper-clad laminate is not limited.

Exemplarily, it can be prepared by the following preparation method: dissolving or dispersing the resin composition in a solvent to obtain a resin varnish having a certain solid content, and then coating the resin varnish on a substrate film (for example, a release film), and drying to obtain a semi-cured thermally conductive insulating film, and then removing the substrate film, and then laminating together with a copper foil and a metal substrate at a high temperature to obtain a metal base copper-clad film laminate.

It may also be prepared by the following preparation method: coating a resin varnish having a certain solid content onto a copper foil, and drying to obtain a copper foil with a semi-cured thermally conductive insulating bonding layer, and then laminating the same with a metal substrate to obtain a metal base copper-clad laminate.

Compared with the prior art, the present disclosure has the following beneficial effects:

(1) In the present disclosure, a flexible epoxy resin is included in the main resin. The flexible epoxy resin provided by the present disclosure can ensure the finally obtained resin composition to have a low modulus. The low modulus can well alleviate the stress generated by thermal shocks, thereby avoiding cracks in solder joints or copper foil circuits caused by the mismatch between the thermal expansion coefficients of the chip and the substrate.

(2) The main resin comprises a phenoxy resin. The use of the phenoxy resin can avoid the stickiness of the finally obtained film or RCC (coated resin copper foil) caused by a too high addition amount of the flexible epoxy resin. Moreover, different from other epoxy resins, the addition of a phenoxy resin to the flexible epoxy resin can avoid greatly increasing the modulus of the composition, while the low modulus of the composition is the guarantee of alleviating stress generated by thermal shocks.

(3) The resin composition for use in a metal substrate provided by the present disclosure has a low modulus, which is less than 1500 MPa and may be as low as 300 MPa. The metal base copper-clad laminate prepared by using the resin composition has a good thermal resistance, a good resistance against thermal shocks and high operability, wherein it has a 288° C. thermal resistance of 6 min or more, up to 10 min; and has a resistance against 1000 or more, up to 1500 or more thermal cycles.

BRIEF DESCRIPTION OF THE DRAWINGS

Wherein, 1-chip; 2-solder joint; 3-copper foil circuit; 4-thermally conductive insulating bonding layer; 5-metal substrate.

DETAILED DESCRIPTION

The technical solution of the present disclosure will be further described below by way of specific embodiments. It should be understood by those skilled in the art that the examples are only to help understanding the present disclosure, and shall not be construed as limiting the disclosure.

Figure 1:
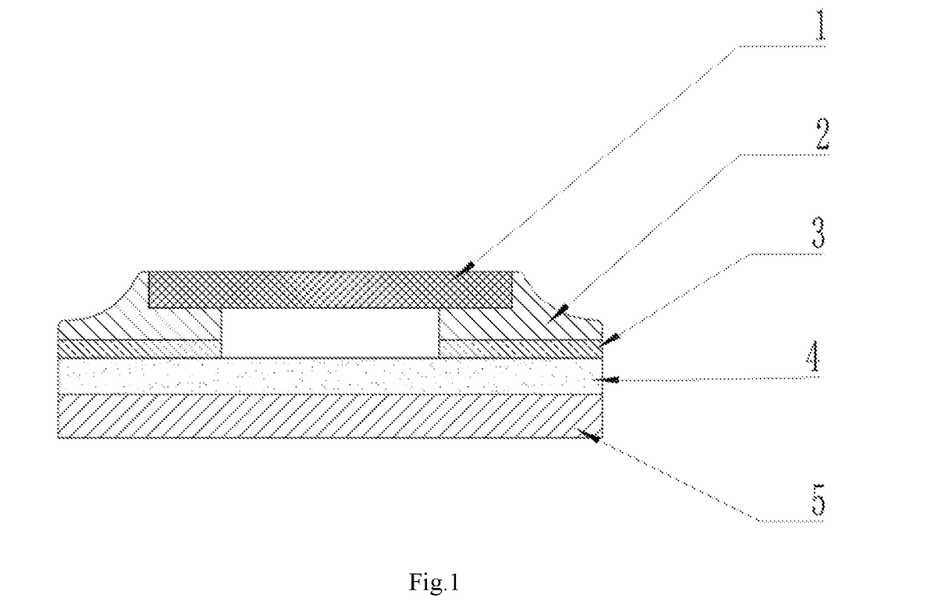
FIG. 1 is a schematic cross-sectional view showing a metal base copper-clad laminate and a chip at a normal temperature.
Figure 2:
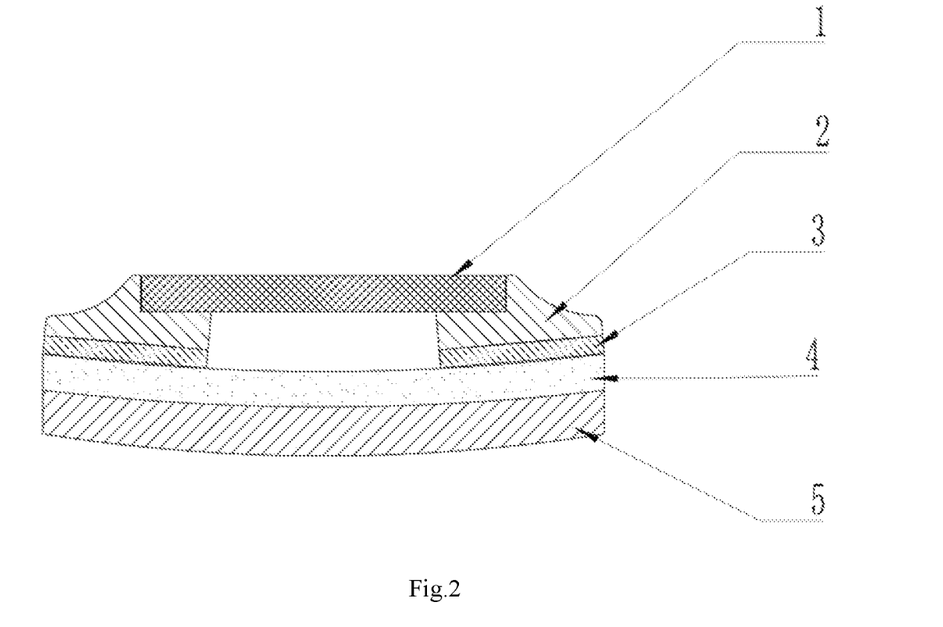
FIG. 2 is a schematic cross-sectional view showing a metal base copper-clad laminate and a chip in the prior art in a state of thermal expansion.
Figure 3:
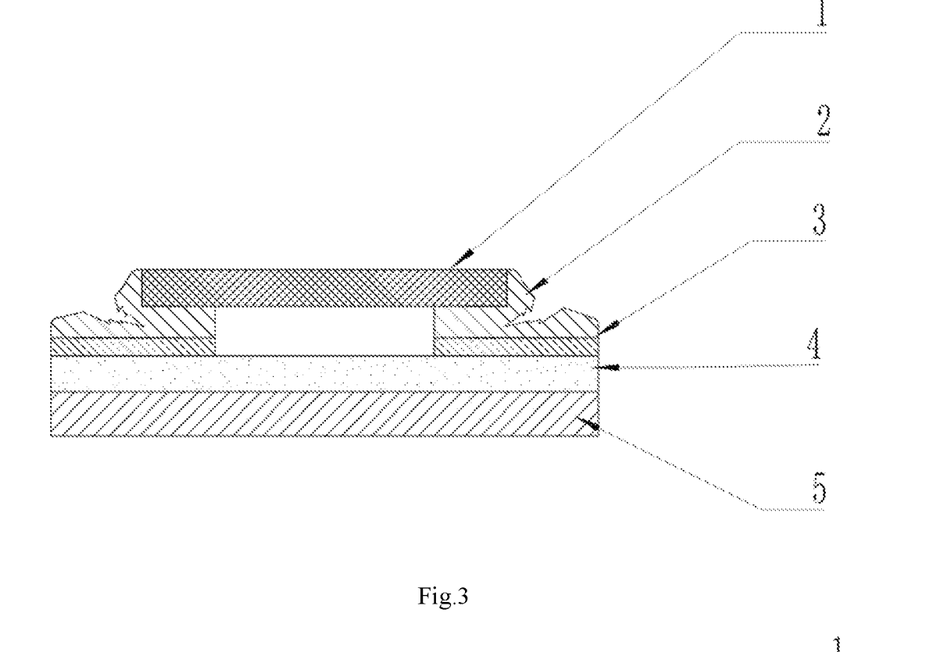
FIG. 3 is a schematic cross-sectional view showing cracking of solder joints of a metal base copper-clad laminate and a chip in the prior art after thermal expansion and cooling.
Figure 4:
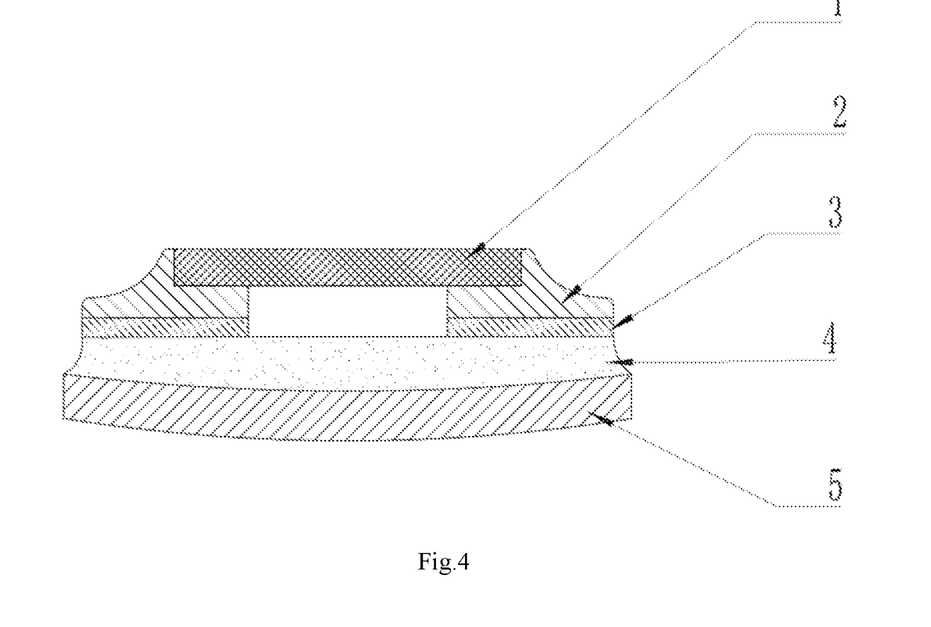
FIG. 4 is a schematic cross-sectional view showing a metal base copper-clad laminate and a chip in the present disclosure in a state of thermal expansion.

It can be seen from FIGS. 1-3 that in a case where a metal base copper-clad laminate in the prior art is used (for example, an LED lighting lamp), the chip, solder joint, copper foil circuit, thermally conductive insulating bonding layer, and metal substrate are all at normal positions at a normal temperature. Once subjected to thermal expansion, the metal substrate, thermally conductive insulating bonding layer and copper foil circuit will be deformed, thereby readily rendering cracks in the solder joint or copper foil circuit after thermal expansion and cooling. However, in a case where the resin composition for use in a metal substrate of the present disclosure is used as a thermally conductive insulating bonding layer, due to the low modulus thereof, only the metal substrate and the thermally conductive insulating bonding layer are deformed, but the copper foil layer is substantially not deformed when subjected to thermal expansion, as shown in FIG. 4.

Therefore, no cracking occurs in the solder joint or copper foil circuit after thermal expansion and cooling.

The materials referred to in the following Examples and Comparative Examples, and brand information thereof are as follows:

(A) Flexible Epoxy Resin

A-1: Product model EXA-4850-150, weight per epoxy equivalent 450 g/eq, manufactured by Dainippon Ink and Chemicals Inc.;

A-2: Product model EXA-4850-1000, weight per epoxy equivalent 350 g/eq, manufactured by Dainippon Ink and Chemicals Inc.;

A-3: Product model EXA-4816, weight per epoxy equivalent 403 g/eq, manufactured by Dainippon Ink and Chemicals Inc., having the structure as follows:

wherein R is an aliphatic segment and m is 0.5-3;

A-4: Product model DX7160, weight per epoxy equivalent 430 g/eq, manufactured by Jiashengde Material Technology Inc., Hunan, China, having the structure as follows:

wherein R is an aliphatic segment and m is 0.5-3;

A-5: An ordinary bisphenol-A epoxy resin, product model NPES-901, weight per epoxy equivalent 475 g/eq, manufactured by Nanya Electronic Materials Inc.;

(B) Phenoxy Resin

B-1: Product model EPONOL Resin53-BH-35, weight average molecular weight 55,000, manufactured by Momenti ye;

B-2: Product model PKHH, weight average molecular weight 50,000, manufactured by Inchem;

B-3: Product model ERF-001, weight average molecular weight 40,000, manufactured by Nippon Steel Chemical;

B-4: Product model YP-50SB, weight average molecular weight 25,000, manufactured by Tohto Kasei;

B-5: Product model YP-50, weight average molecular weight 70,000, manufactured by Tohto Kasei;

(C) Biphenyl Epoxy Resin

C-1: Product model NC-3000H, weight per epoxy equivalent 285 g/eq, manufactured by Nippon Kayaku Inc.;

C-2: Product model YX-4000, weight per epoxy equivalent 185 g/eq, manufactured by Mitsubishi Chemical Inc.;

(D) Curing Agent

D-1: Triethylenetetramine;

D-2: Diaminodiphenyl sulfone;

D-3: An active ester, product model HPC-8000-651, manufactured by Dainippon Ink and Chemicals Inc.;

(E) Thermally Conductive Filler

E-1: Alumina, Sumitomo, Japan;

E-2: Boron nitride, Momentive, American;

(F) Curing Accelerator

F-1: 2-Methylimidazole

EXAMPLES 1-15

Resin compositions were prepared in accordance with the components shown in Tables 1-2, and metal base copper-clad laminate samples were prepared in accordance with the preparation method below.

The components in the formula amount were uniformly mixed in a solvent, and the solid content of the varnish was controlled to be 75%. The varnish was applied to a copper foil having a thickness of 35 μm, and dried at 155° C. for 5 minutes to obtain a copper foil (having a thickness of 35 μm) with a semi-cured thermally conductive insulating bonding layer (having a thickness of 100 μm), which was then laminated with a surface-treated aluminum plate (having a thickness of 1.0 mm) to obtain an aluminum-based copper-clad laminate.

COMPARATIVE EXAMPLES 1-11

Resin compositions were prepared in accordance with the components shown in Tables 3 and 4, and metal base copper-clad laminate samples were prepared in accordance with the preparation method described in the examples.

TABLE 1

|  | Example 1 | Example 2 | Example 3 | Example 4 | Example 5 | Example 6 | Example 7 | Example 8 |
|---|---|---|---|---|---|---|---|---|
| A-1 | 16 |  | 16 | 16 | 16 | 16 | 16 | 16 |
| A-2 |  | 16 |  |  |  |  |  |  |
| A-3 |  |  |  |  |  |  |  |  |
| A-4 |  |  |  |  |  |  |  |  |
| A-5 |  |  |  |  |  |  |  |  |
| B-1 | 3 | 3 |  |  |  |  | 3 | 3 |
| B-2 |  |  | 3 |  |  |  |  |  |
| B-3 |  |  |  | 3 |  |  |  |  |
| B-4 |  |  |  |  | 3 |  |  |  |
| B-5 |  |  |  |  |  | 3 |  |  |
| C-1 | 1 | 1 | 1 | 1 | 1 | 1 |  | 1 |
| C-2 |  |  |  |  |  |  | 1 |  |
| D-1 | 0.2 | 0.2 | 0.2 | 0.2 | 0.2 | 0.2 | 0.2 | 1 |
| D-2 | 0.8 | 0.8 | 0.8 | 0.8 | 0.8 | 0.8 | 0.8 |  |
| D-3 |  |  |  |  |  |  |  |  |
| E-1 | 80 | 80 | 80 | 80 | 80 | 80 | 80 | 60 |
| E-2 |  |  |  |  |  |  |  | 20 |
| F-1 | 0.1 | 0.1 | 0.1 | 0.1 | 0.1 | 0.1 | 0.1 | 0.1 |

TABLE 2

|  | Example 9 | Example 10 | Example 11 | Example 12 | Example 13 | Example 14 | Example 15 |
|---|---|---|---|---|---|---|---|
| A-1 | 16.8 | 12 | 18 | 12 | 32 | 4 | 16 |
| A-2 |  |  |  |  |  |  |  |
| A-3 |  |  |  |  |  |  |  |
| A-4 |  |  |  |  |  |  |  |
| A-5 |  |  |  |  |  |  |  |
| B-1 | 3.2 | 8 | 2 | 4 | 4 | 0.5 | 3 |
| B-2 |  |  |  |  |  |  |  |
| B-3 |  |  |  |  |  |  |  |
| B-4 |  |  |  |  |  |  |  |
| B-5 |  |  |  |  |  |  |  |
| C-1 |  |  |  | 4 |  |  | 1 |
| C-2 |  |  |  |  | 4 | 0.5 |  |
| D-1 | 0.2 | 0.2 | 0.2 | 0.2 | 0.4 | 0.2 |  |
| D-2 | 0.8 | 0.8 | 0.8 | 0.8 | 1.6 | 0.8 |  |
| D-3 |  |  |  |  |  |  | 1 |
| E-1 | 80 | 80 | 80 | 80 | 60 | 95 | 80 |
| E-2 |  |  |  |  |  |  |  |
| F-1 | 0.1 | 0.1 | 0.1 | 0.1 | 0.1 | 0.1 | 0.1 |

TABLE 3

|  | Comp. Example 1 | Comp. Example 2 | Comp. Example 3 | Comp. Example 4 | Comp. Example 5 |
|---|---|---|---|---|---|
| A-1 |  |  |  |  | 20 |
| A-2 |  |  |  |  |  |
| A-3 | 16 |  |  |  |  |
| A-4 |  | 16 |  |  |  |
| A-5 |  |  | 16 |  |  |
| B-1 | 3 | 3 | 3 |  | 20 |
| B-2 |  |  |  |  |  |
| B-3 |  |  |  |  |  |
| B-4 |  |  |  |  |  |
| B-5 |  |  |  |  |  |
| C-1 | 1 | 1 | 1 |  |  |
| C-2 |  |  |  |  |  |
| D-1 | 0.2 | 0.2 | 0.2 | 0.2 | 0.2 |
| D-2 | 0.8 | 0.8 | 0.8 | 0.8 | 0.8 |
| D-3 |  |  |  |  |  |
| E-1 | 80 | 80 | 80 | 80 | 80 |
| E-2 |  |  |  |  |  |
| F-1 | 0.1 | 0.1 | 0.1 | 0.1 | 0.1 |

TABLE 4

|  | Comp. Example 6 | Comp. Example 7 | Comp. Example 8 | Comp. Example 9 | Comp. Example 10 | Comp. Example 11 |
|---|---|---|---|---|---|---|
| A-1 | 3.2 | 40 | 10 | 18 | 11 | 18.5 |
| A-2 |  |  |  |  |  |  |
| A-3 |  |  |  |  |  |  |
| A-4 |  |  |  |  |  |  |
| A-5 |  |  |  |  |  |  |
| B-1 | 0.6 | 7.5 | 9 | 1 | 8 | 0.5 |
| B-2 |  |  |  |  |  |  |
| B-3 |  |  |  |  |  |  |
| B-4 |  |  |  |  |  |  |
| B-5 |  |  |  |  |  |  |

TABLE 4-continued

|  | Comp. Example 6 | Comp. Example 7 | Comp. Example 8 | Comp. Example 9 | Comp. Example 10 | Comp. Example 11 |
|---|---|---|---|---|---|---|
| C-1 | 0.2 | 2.5 | 1 | 1 | 1 | 1 |
| C-2 |  |  |  |  |  |  |
| D-1 | 0.05 | 0.2 | 0.2 | 0.2 | 0.2 | 0.2 |
| D-2 | 0.2 | 0.8 | 0.8 | 0.8 | 0.8 | 0.8 |
| D-3 |  |  |  |  |  |  |
| E-1 | 96 | 50 | 80 | 80 | 80 | 80 |
| E-2 |  |  |  |  |  |  |
| F-1 | 0.1 | 0.1 | 0.1 | 0.1 | 0.1 | 0.1 |

Performance Test 1

The metal base copper-clad laminates provided in Examples 1-15 and Comparative Examples 1-11 were tested for performance as follows:

(1) Thermal conductivity/thermal impedance: The metal substrates were made into samples of 25.4 mm×25.4 mm to test the thermal conductivity/thermal impedance of the laminates by referring to the ASTM D5470 test method;

(2) Thermal resistance (288° C.): The thermal resistance of the laminates was tested by referring to the experimental conditions in the IPC-TM-650 2.4.13 method;

(3) Modulus: The modulus of the insulating bonding layers was tested by referring to the experimental conditions in the IPC-TM-650 2.4.24.4 method;

(4) Number of thermal cycles: After several thermal cycles between −50° C. and 150° C., the laminates were sliced and analyzed for the binding of each layer to determine whether delamination occurred;

(5) Operationality: The evaluation was carried out based on convenience in actual use: no stickiness was evaluated as "excellent", a little stickiness was evaluated as "good", and stickiness was evaluated as "poor";

(6) Voltage resistance test: The voltage resistance of the thermally conductive insulating layers was tested according to the method in T/CPCA 4105-2016. The average value of 5 points was calculated;

(7) Weight average molecular weight: Performed using the test method specified in GB/T 21863-2008 gel permeation chromatography (GPC) using tetrahydrofuran as the eluent. (The molecular weight of the phenoxy resin was determined by the weight average molecular weight test).

The test results are shown in Tables 5-8.

TABLE 5

|  | Example 1 | Example 2 | Example 3 | Example 4 | Example 5 | Example 6 | Example 7 | Example 8 |
|---|---|---|---|---|---|---|---|---|
| Thermal conductivity (W/m · K) | 2.0 | 2.0 | 2.0 | 2.0 | 2.0 | 2.0 | 2.0 | 3.0 |
| 288° C. Thermal resistance (min) | 10 | 8 | 10 | 10 | 10 | 10 | 10 | 10 |
| 50° C. Modulus (MPa) | 420 | 800 | 440 | 450 | 800 | 350 | 430 | 600 |
| Number of thermal cycles (times) | 1500 | 1300 | 1500 | 1500 | 1300 | 1500 | 1500 | 1500 |
| Operability | Excellent | Excellent | Excellent | Excellent | Excellent | Good | Excellent | Excellent |
| Voltage resistance (V) | 5000 | 5000 | 5000 | 5000 | 5000 | 5000 | 5000 | 5000 |

TABLE 6

|  | Example 9 | Example 10 | Example 11 | Example 12 | Example 13 | Example 14 | Example 15 |
|---|---|---|---|---|---|---|---|
| Thermal conductivity (W/m · K) | 2.0 | 2.0 | 2.0 | 2.0 | 1.5 | 5.0 | 2.0 |
| 288° C. Thermal resistance (min) | 9 | 9 | 9 | 10 | 6 | 6 | 6 |
| 50° C. Modulus (MPa) | 400 | 600 | 300 | 800 | 300 | 1500 | 1500 |
| Number of thermal cycles (times) | 1500 | 1500 | 1500 | 1300 | 1500 | 1300 | 1200 |

TABLE 6-continued

|  | Example 9 | Example 10 | Example 11 | Example 12 | Example 13 | Example 14 | Example 15 |
|---|---|---|---|---|---|---|---|
| Operability | Excellent | Excellent | Excellent | Excellent | Excellent | Excellent | Excellent |
| Voltage resistance (V) | 5000 | 5000 | 5000 | 5000 | 5000 | 3500 | 4000 |

TABLE 7

|  | Comp. Example 1 | Comp. Example 2 | Comp. Example 3 | Comp. Example 4 | Comp. Example 5 |
|---|---|---|---|---|---|
| Thermal conductivity (W/m·K) | 2.0 | 2.0 | 2.0 | 2.0 | 2.0 |
| 288° C. Thermal resistance (min) | 5 | 5 | 5 | 5 | 5 |
| 50° C. Modulus (MPa) | 900 | 850 | 10500 | 250 | 2100 |
| Number of thermal cycles (times) | 900 | 850 | 500 | 1000 | 800 |
| Operability | Excellent | Excellent | Excellent | poor | Excellent |
| Voltage resistance (V) | 4000 | 4000 | 5000 | 4000 | 5000 |

TABLE 8

|  | Comp. Example 6 | Comp. Example 7 | Comp. Example 8 | Comp. Example 9 | Comp. Example 10 | Comp. Example 11 |
|---|---|---|---|---|---|---|
| Thermal conductivity (W/m·K) | 7.0 | 0.8 | 2.0 | 2.0 | 2.0 | 2.0 |
| 288° C. thermal resistance (min) | 2 | 5 | 8 | 8 | 8 | 8 |
| 50° C. Modulus (MPa) | 3000 | 200 | 1000 | 280 | 900 | 270 |
| Number of thermal cycles (times) | 800 | 1300 | 900 | 1300 | 900 | 1300 |
| Operability | Excellent | Good | Excellent | Poor | Excellent | Poor |
| Voltage resistance (V) | 2000 | 5000 | 5000 | 5000 | 5000 | 5000 |

It can be seen from the Examples and the Performance Test that the metal base laminates prepared by the disclosure have better comprehensive performance, wherein the 288° C. thermal resistance is 6 min or more; the number of thermal cycles is 1200 or more; and the operability is excellent. All laminates can satisfy the application requirements.

As can be seen from the comparison between Example 1 and Examples 3-6, when the weight average molecular weight of the phenoxy resin is not within the range of 30,000 to 65,000, for example, when the weight average molecular weight of the phenoxy resin of Example 5 is less than 30,000, the laminate sample has a number of thermal cycles of 1300; and for another example, when the weight average molecular weight of the phenoxy resin of Example 6 is higher than 65,000, there are some certain influence on operability. As can be seen from the comparison between Example 1 and Examples 9-11, when no biphenyl epoxy resin is added, the laminate sample has a poor 288° C. thermal resistance, which is 9 min. As can be seen from the comparison between Example 1 and Examples 13-14, when the main resin accounts for 40% of the total weight of the resin composition, the laminate sample has a low modulus at 50° C., but has a thermal conductivity of 1.5 W/m·K, and a 288° C. thermal resistance of 6 min. While when the thermally conductive filler accounts for 95% of the total weight of the resin composition, the thermal conductivity of the laminate sample is significantly increased; but the modulus at 50° C. achieves 1500 MPa; and the 288° C. thermal resistance is 6 min.

As can be seen from the comparison between Example 1 and Example 15, the use of the active ester curing agent greatly increases the modulus of the laminate sample; and its 288° C. thermal resistance is 6 min, and the voltage resistance value is as low as 4000 V.

As can be seen from the comparison between Example 1 and Comparative Examples 1-3, although the laminate samples in Comparative Examples 1-2 can also obtain a low modulus, but they have a poor 288° C. thermal resistance and poor thermal cycle property, which is because the flexible epoxy used in Comparative Examples 1-2 contains a hydroxyl structure. Since Comparative Example 3 used an ordinary bisphenol-A epoxy resin, its modulus at 50° C. is as high as 10,500 MPa, and its 288° C. thermal resistance and thermal cycle property are also poor. As can be seen from the comparison between Example 1 and Comparative Example 4, when only a flexible epoxy resin is used in the main resin, the resulting laminate sample has a poor thermal resistance and operability.

As can be seen from the comparison between Example 1 and Comparative Example 5, when only a phenoxy resin is used in the main resin, the resulting laminate sample has a poor 288° C. thermal resistance and poor thermal cycle property, and has a modulus up to 2,100 MPa. As can be seen from the comparison between Example 1 and Comparative Examples 6 and 7, when the addition amount of the main resin is not within the range of 5 to 40%, for example when the addition amount is too small, the laminate has a high modulus and a poor thermal resistance and thermal cycle property; when the addition amount is too high, the thermal conductivity is reduced, the thermal resistance is poor, and the operability is affected to some extent. As can be seen from the comparison between Example 1 and Comparative Examples 8 and 11, when the amount of the flexible oxygen resin added to the main resin is too small, and the amount of the phenoxy resin added to the main resin is too high, the laminate has a high modulus, a slightly poor thermal resistance and poor thermal cycle property; when the amount of the flexible oxygen resin added to the main resin is too high, and the amount of the phenoxy resin added to the main resin is too small, the laminate has a poor thermal resistance and poor operability. As can be seen from the comparison between Example 1 and Comparative Examples 9-10, when the amount of the phenoxy resin added to the main resin is too small, the laminate has a poor thermal resistance and poor operability; when the amount of the flexible epoxy resin to the main resin is too small, the laminate has high modulus, and poor thermal resistance and thermal cycle property.

EXAMPLES 16-19

The difference from Example 1 was that the resin composition provided in Example 1 was kept unchanged, but the thickness of the thermally conductive insulating bonding layer was changed. The thicknesses of the thermally conductive insulating bonding layers in resulting aluminum-based copper-clad laminates were 40 μm (Example 16), 200 μm (Example 17), 30 μm (Example 18) and 220 μm (Example 19).

Performance Test 2

The metal base copper-clad laminates provided in Examples 16-19 were tested for performance by referring to Performance Test 1. The test results are shown in Table 9.

TABLE 9

| | Example 16 | Example 17 | Example 18 | Example 19 |
|---|---|---|---|---|
| Thermal impedance (° C. · cm²/W) | 0.2 | 1.0 | 0.15 | 1.1 |
| 288° C. Thermal resistance (min) | 10 | 10 | 10 | 10 |
| 50° C. Modulus (MPa) | 420 | 420 | 420 | 420 |
| Number of thermal cycles (times) | 1200 | 1500 | 1000 | 1500 |
| Operability | Excellent | Excellent | Excellent | Excellent |
| Voltage resistance (V) | 3000 | 8000 | 2000 | 8000 |

As can be seen from the comparison between Example 1, Examples 16-17 and Examples 18-19, the preferable thickness of the thermally conductive insulating bonding layer of the present disclosure is 0.04-0.20 mm. The metal base copper-clad laminate having such thickness prepared by the present disclosure has better comprehensive performance. If the thermally conductive insulating bonding layer has a too small thickness, the stress generated by thermal shocks cannot be sufficiently alleviated, and the voltage resistance is low. If the thermally conductive insulating bonding layer has a too high thickness, although the stress generated by thermal shocks can be sufficiently alleviated, the thermal impedance becomes high, which is not conducive to the rapid heat dissipation of the metal substrate.

The applicant has stated that the resin composition for use in a metal substrate of the present disclosure, the resin varnish and the metal base copper-clad laminate comprising the same are described by the above embodiments, but the present disclosure is not limited to the above process steps. That is, it does not mean that the present disclosure must rely on the above process steps to implement. Those skilled in the art shall know that any modifications to the present disclosure, equivalent replacements of the materials selected in the present disclosure, the addition of the auxiliary ingredients, and the selection of specific manner all fall within the scope of protection and disclosure of the present disclosure.

What is claimed is:

1. A resin composition for a metal substrate, comprising 20 weight parts of a resin mixture and 80 weight parts of a thermally conductive filler;

wherein the resin mixture consists of 80% of a flexible epoxy resin having a structure as shown in Formula I, Formula I

-continued

15% of a phenoxy resin with weight average molecular weight of 40,000-55,000, and 5% of a biphenyl epoxy resin having a structure as shown in Formula II or Formula III based on the total weight of the resin mixture being 100%, wherein R is selected from C2-C20 linear or branched alkylene groups;

$n_1$ represents a mean repeating unit of 4-10;

n represents a mean repeating unit of 1-10;

wherein the thermally conductive filler comprises is selected from the group consisting of aluminum nitride, boron nitride, aluminum oxide, silicon carbide, zinc oxide and carbon nanotubes, and combinations thereof;

wherein the resin composition further comprises 1 weight part of an amine curing agent selected from the group consisting of ethylenediamine, diethylenetriamine, triethylenetetramine, tetraethylenepentamine, isophoronediamine, m-phenylenediamine, m-aminomethylamine, diaminodiphenyl sulfone, dicyandiamide, diaminodicyclohexyl methane, methylcyclopentanediamine, diamine methylcyclohexanediamine, diaminodiphenylmethane, and combination thereof.

2. The resin composition for a metal substrate according to claim 1, wherein the thermally conductive filler comprises any one or a combination of at least two selected from the group consisting of boron nitride, aluminum oxide and silicon carbide.

3. The resin composition for a metal substrate according to claim 1, wherein the resin composition further comprises 0.1-2 weight parts of a curing accelerator.

4. A resin varnish obtained by dissolving or dispersing the resin composition for a metal substrate according to claim 1 into a solvent.

5. A film comprising the resin composition for a metal substrate according to claim 1.

6. A metal base copper-clad laminate comprising a metal substrate, a thermally, conductive insulating bonding layer prepared from the resin composition for a metal substrate according to claim 1 and a copper foil which are laminated together from bottom to top.

7. The metal base copper-clad laminate according to claim 6, wherein the metal substrate comprises any one selected from the group consisting of an aluminum substrate, a copper substrate, an iron substrate and a steel substrate.

8. The metal base copper-clad laminate according to claim 6, wherein the thermally conductive insulating bonding layer has a thickness of 0.04-0.20 mm.

9. The metal base copper-clad laminate according to claim 6, wherein the copper foil is an electrodeposited copper foil or a rolled copper foil; and the copper foil has a thickness of 0.012-0.210 mm.

* * * * *